Patented Feb. 13, 1940

2,190,287

UNITED STATES PATENT OFFICE 2,190,287

PRESERVATION OF RUBBER HYDROCHLORIDE

Albert Hershberger, Buffalo, N. Y., assignor to E. I. du Pont de Nemours & Company, Wilmington, Del., a corporation of Delaware No Drawing. Application June 1, 1939, Serial No. 276,803

4 Claims. (Cl. 23—244)

This invention relates to a method of preserving (and storing) rubber hydrochloride over long periods of time without detrimental decomposition.

It is well known that chlorine-containing rubberlike compounds, such as the product commonly called rubber hydrochloride, are produced by treatment of vulcanized rubber, unvulcanized rubber, reclaimed rubber, latex, gutta percha, balata, and the like, with hydrogen chloride or with hydrogen chloride in combination with chlorine. These compounds contain widely varying amounts of chlorine as the result of the reaction with the hydrogen chloride and/or chlorine.

It is usually desirable to manufacture rubber hydrochloride and the like in considerable quantity (the methods of preparation are well known in the art), and to store it until used. It is likewise desirable to be able to transport this material in the form in which it is prepared.

These chlorine-containing rubber-like compounds are characterized, depending upon various factors such as their chlorine content, the particular method utilized in their production, etc., by a greater or lesser degree of chemical instability. This ordinarily manifests itself in a more or less gradual decomposition with the evolution of hydrogen chloride. This decomposition and evolution of hydrogen chloride is particularly marked at elevated temperatures and upon exposure to ultra-violet light, and heretofore these agencies, together with the inherent properties of the compound, have been considered responsible for the failure of the material to stand up with age. While it has been recognized that the decomposition of these chlorine-containing compounds, such as rubber hydrochloride, is promoted by heat and light, the exact mechanism of the deterioration has remained obscure. Whether these factors operate independently of other factors or not, is still a matter for debate.

It has been proposed to stabilize these chlorine containing compounds of rubber and the like, to prevent or minimize decomposition, by the addition of various antacids and/or basic materials. This method of stabilization introduces contaminating materials into the product, and often renders the product somewhat, or even entirely, unsuitable for various uses to which it would otherwise be adapted.

It is desirable, in most cases, to postpone the addition of other materials to the rubbery hydrogenchloride derivative for considerable periods of time, for example, until the material can be worked up into articles of manufacture such as film, etc. It is a great inconvenience and expense to have to separately compound such material with antacids or basic materials in order to minimize decomposition over the periods of storage and transportation.

It has now been discovered that certain constituents of the atmosphere, such as oxygen and ozone, contribute markedly to the decomposition of rubber hydrochloride. This hitherto unrecognized fact is a valuable aid in devising means of restraining the inimical deterioration.

It is, therefore, an object of this invention to provide a means of preventing or minimizing the decomposition of rubber hydrohalides and similar products. It is a further object to prevent or minimize decomposition in such products by methods which do not contaminate the chlorine-containing rubber derivatives. It is a still further object to provide a simple and highly satisfactory means of storing and transporting rubber hydrochloride so as to prevent or minimize decomposition thereof. A general advance in the art, and other objects which will appear hereinafter, are also contemplated.

The surprising and remarkable discovery has now been made that decomposition of rubber hydrochloride may be prevented, or reduced to a negligible degree, merely by maintaining it under water during storage and transportation. Related methods of excluding the atmosphere are also effective. This method is effective even in the presence of light, although exclusion of sunlight and other forms of ultra-violet illumination will enhance the protection secured.

From the following description and specific examples, in which are disclosed certain embodiments of the invention as well as details of what is believed to be the best mode for carrying out the invention, it will be apparent how the foregoing objects and related ends are accomplished.

Example I

Rubber hydrochloride containing 31.5% of chlorine prepared by treating crepe rubber with dry hydrogen chloride was separated from excess hydrochloric acid, neutralized, and washed free of all traces of hydrochloric acid. Immediately upon finishing the purification process, the rubber hydrochloride mass was shredded and immersed in water. After standing in such a condition (under water) for a period of three months, the rubber hydrochloride shreds were found to be of very light color, and the water tested neutral with litmus paper. This indicated that a negligible amount of hydrochloric acid at most had been lost from the rubber compound. Not only was it possible to store a rubber hydrochloride in this condition, but it could also be shipped and transported in suitable containers while immersed in water.

Example II

Rubber hydrochloride prepared in the manner described in Example I was immersed, shortly after preparation, in acetone. After storage at ordinary temperatures for a period of one month, the rubber hydrochloride was found to be of very light color and no free hydrochloric acid was detectable in the container.

Example III

Rubber hydrochloride was prepared, having a content of 29% of chlorine and, shortly after preparation, was immersed in ethyl alcohol, containing 5% water. No decomposition of the rubber hydrochloride was observed over a period of two months.

Example IV

The process of Example III was repeated, using distilled water as the fluid. Similar results were obtained.

Example V

The process of Example III was repeated, using tap water from the city supply as the fluid. Similar results were obtained.

Example VI

The process of Example III was repeated, using hard water as the fluid. Similar results were obtained.

Example VII

The process of Example III was repeated, using softened water as the fluid. Similar results were obtained.

While water and, to a lesser extent, ketones and alcohols, are the preferred protecting fluids, in general liquids that do not liberate oxygen or otherwise tend to decompose or react with the rubber hydrochloride may be used. This of course includes members of the ester and aliphatic hydrocarbon series. Ordinary tap water from the city mains is obviously the most convenient, and is very satisfactory. For economic reasons it is preferred.

Rubber hydrochloride of all chlorine contents up to 36% may be stabilized by this process, but it is preferred to apply the method to a rubber hydrochloride containing 27% to 31.5% chlorine. Material of higher than 36% chlorine content may also be stored under water and the like.

Other rubber hydrohalides, such as the hydrobromides and hydroiodides, are also stabilized to a satisfactory extent by immersion in these liquids.

It will be understood that oxygen, ozone and other constituents of the atmosphere which contribute to the decomposition of rubber hydrochloride may also be excluded by sealing the material in vacuo or by sealing it in a gas-tight container together with an inert gas, such as nitrogen. This simple method of suspending or immersing rubber hydrochloride flake in water or other non-solvent liquid to prevent contact with deteriorating agencies, is most effective. Rubber hydrochloride immersed in water (or other suitable liquid) has been found to remain colorless over a period of several months without the necessity of adding any other substance which has been used heretofore as a preservative or stabalizer for the rubber hydrochloride. Furthermore, it has been observed that rubber hydrochloride flake which has become slightly discolored due to decomposition actually is leached by immersion in water, and thereafter remains of a very light color. Water in which rubber hydrochloride has been immersed for a period of several months has been found to be practically free of acid. On the other hand, similar rubber hydrochloride flake when exposed to the air darkens within a week and assumes a deep brown color after a period of a month; an analysis of such material shows that it has lost part of its original chlorine content.

The process of preserving rubber hydrohalides of this invention provides a means of storing and transporting such materials without the necessity of adding extraneous compounds (which may at a later time prove undesirable).

The procedure of this invention is not only characterized by extreme simplicity, but also by its outstanding effectiveness, giving as it does adequate protection over a period of several months or longer.

Another advantage of this method of storing makes possible the production of rubber hydrochloride on a large scale at a time when it might otherwise be inconvenient for the further processing of the material.

As many apparently widely different embodiments of this invention may be made without departing from the spirit and scope thereof, it is to be understood that I do not limit myself to the specific embodiments thereof except as defined in the appended claims.

I claim:

1. A package consisting of rubber hydrochloride of 27% to 31.5% chlorine content immersed in water and a container therefor.

2. The process of preserving rubber hydrochloride which is prepared by treating rubber with hydrogen chloride, separating excess hydrochloric acid, neutralizing and washing free from traces of hydrochloric acid, which comprises submerging the rubber hydrochloride in water and maintaining it so submerged in order to prevent the release of hydrogen chloride.

3. The process of preserving rubber hydrochloride which is prepared by treating rubber with hydrogen chloride, separating excess hydrochloric acid, neutralizing and washing free from traces of hydrochloric acid which comprises covering rubber hydrochloride with a non-solvent liquid and maintaining it so covered in order to prevent the release of hydrogen chloride.

4. The process of preserving rubber hydrochloride which is prepared by treating rubber with hydrogen chloride, separating excess hydrochloric acid, neutralizing and washing free from traces of hydrochloric acid which comprises covering said rubber hydrochloride with acetone, and maintaining it so covered in order to prevent the release of hydrogen chloride.

ALBERT HERSHBERGER.